United States Patent [19]
Mastenbroek et al.

[11] Patent Number: 5,138,032
[45] Date of Patent: Aug. 11, 1992

[54] BATCH/CONTINUOUS POLYMERIZATION OF OLEFIN/CARBON MONOXIDE

[75] Inventors: Barend Mastenbroek; Leonardus Petrus; Philip J. M. M. De Smedt, all of Amsterdam, Netherlands

[73] Assignee: Shell Oil Company, Houston, Tex.

[21] Appl. No.: 671,245

[22] Filed: Mar. 19, 1991

[30] Foreign Application Priority Data

Apr. 6, 1990 [NL] Netherlands ............ 9000812

[51] Int. Cl.$^5$ ............................. C08G 67/02
[52] U.S. Cl. ............................. 528/392; 525/539
[58] Field of Search ................ 528/392; 525/539

[56] References Cited

U.S. PATENT DOCUMENTS

| | | | |
|---|---|---|---|
| 2,495,286 | 1/1950 | Brubaker | 528/392 |
| 3,694,412 | 9/1972 | Nozaki | 260/63 |
| 4,818,810 | 4/1989 | Drent | 528/92 |
| 4,835,250 | 5/1989 | Drent | 528/392 |
| 4,843,144 | 6/1989 | Van Broekhoven et al. | 528/392 |
| 4,868,282 | 9/1989 | Van Broekhoven et al. | 528/392 |
| 4,880,903 | 11/1989 | Van Broekhoven et al. | 528/392 |
| 4,940,776 | 7/1990 | Bakkum et al. | 528/392 |

FOREIGN PATENT DOCUMENTS

| | | |
|---|---|---|
| 121965 | 10/1984 | European Pat. Off. |
| 181014 | 5/1986 | European Pat. Off. |
| 213671 | 3/1987 | European Pat. Off. |
| 257663 | 3/1988 | European Pat. Off. |

*Primary Examiner*—Harold D. Anderson

[57] ABSTRACT

In an improved start-up procedure for the continuous production of linear alternating polymers of carbon monoxide and at least one ethylenically unsaturated hydrocarbon, by contacting the carbon monoxide and hydrocarbon under polymerization conditions in the presence of a catalyst composition formed from a palladium compound, the anion of a strong non-hydrohalogenic acid and a bidentate ligand of phosphorus, the start-up period is shortened when the reaction mixture at the start of continuous operation contains previously prepared linear alternating polymer.

15 Claims, No Drawings

BATCH/CONTINUOUS POLYMERIZATION OF OLEFIN/CARBON MONOXIDE

FIELD OF THE INVENTION

This invention relates to an improved process for the production of linear alternating polymers of carbon monoxide and at least one ethylenically unsaturated hydrocarbon. More particularly, the invention relates to an improved start-up procedure for initiating the polymerization of carbon monoxide and at least one ethylenically unsaturated hydrocarbon to produce such linear alternating polymers.

BACKGROUND OF THE INVENTION

The class of linear alternating polymers of carbon monoxide and at least one ethylenically unsaturated hydrocarbon has been known for some time. Nozaki, e.g., U.S. Pat. No. 3,694,412, produced such polymers in the presence of arylphosphine complexes of palladium moieties as catalyst and certain inert solvents. More recent procedures for the production of the linear alternating polymers, now known as polyketones or polyketone polymers, are illustrated by a number of published European Patent Applications including Nos. 121,965, 181,014, 213,671 and 257,663. These processes involve the use of a catalyst composition formed from a compound of palladium, nickel or cobalt, the anion of a strong non-hydrohalogenic acid and a bidentate ligand of phosphorus, arsenic, antimony or nitrogen. The resulting polymers are relatively high molecular weight materials having established utility as premium thermoplastics.

The polymerization to produce the linear alternating polymers is conducted by a variety of process methods. In a batch process, the reactants, catalyst composition and a reaction diluent are charged to a suitable reactor operating under polymerization conditions. In a batch process, only the reaction temperature stays constant and other reaction variables change over time. In a semi-continuous process, the reaction pressure is held constant by continued addition of monomeric reactants as polymerization proceeds. From a number of considerations a continuous process of polymerization affords even greater advantages. The monomeric reactants, catalyst composition and reaction diluent are continuously provided to the reactor. The polymer product, as a suspension in the reaction diluent, increases in concentration until a steady state is reached. At this point, product suspension of substantially constant concentration is withdrawn from the reactor. The polymer so produced will have substantially constant properties.

At steady state polymerization, the actual polymer suspension concentration is important as is the bulk density of the polymer. The higher the polymer suspension concentration, up to the point where the viscosity of the mixture renders further heat removal difficult, the greater the amount of polymer that can be made per unit of reaction diluent. The greater the bulk density of the polymer the larger the amount of polymer that can be made in a reactor of given volume.

The polymer suspension concentration and bulk density at steady state polymerization have been found to depend to a considerable extent upon the manner in which the polymerization has been initiated or "started-up". The start-up period is that part of the polymerization time which takes place before the steady state polymerization is reached. In copending U.S. patent application Ser. No. 668,848, filed Mar. 13, 1991 there is described a start-up procedure which results in desirable polymer suspension concentrations and polymer bulk densities under steady state operation. In this procedure, the concentration of the catalyst composition is initially lower than that required for steady state operation but increases during the initiation or start-up period. Despite the desirable results of this start-up procedure, it is on occasion somewhat slow. It would be of advantage to provide an improved start-up procedure for initiating the polymerization of carbon monoxide and at least one ethylenically unsaturated hydrocarbon to produce linear alternating polymers.

SUMMARY OF THE INVENTION

The present invention provides an improved process for the production of linear alternating polymers of carbon monoxide and at least one ethylenically unsaturated hydrocarbon. More particularly, the invention provides an improved start-up procedure for the process of producing the linear alternating polymers wherein polymerization is initiated in the presence of an amount of a linear alternating polymer of the general type as that whose production is desired.

DESCRIPTION OF THE INVENTION

In the present invention, a small proportion of previously produced linear alternating polymer is present during the start-up or initiation period of a polymerization process for the production of linear alternating polymers of carbon monoxide and at least one ethylenically unsaturated hydrocarbon.

The ethylenically unsaturated hydrocarbons useful as precursors of the polymers produced by the process of the invention contain up to 20 carbon atoms inclusive, preferably up to 10 carbon atoms inclusive, and are aliphatic including ethylene and other $\alpha$-olefins such as propylene, butylene, isobutylene, 1-hexene, 1-octene and 1-dodecene, or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polymers produced by the process of the invention are copolymers of carbon monoxide and ethylene and the preferred terpolymers are terpolymers of carbon monoxide, ethylene and a second hydrocarbon of at least 3 carbon atoms, particularly an $\alpha$-olefin such as propylene.

When the preferred terpolymers are produced by the process of the invention, there will be at least about 2 units incorporating a moiety of ethylene for each unit incorporating a moiety of the second ethylenically unsaturated hydrocarbon of at least 3 carbon atoms. Preferably, there will be from about 10 to about 100 units incorporating a moiety of ethylene for each unit incorporating a moiety of the second hydrocarbon. The polymer chain of the preferred polyketone polymers is therefore represented by the repeating formula $$\pm CO\pm CH_2-CH_2\pm\pm\pm CO\pm G\pm\pm \qquad (I)$$

wherein G is the moiety of an ethylenically unsaturated hydrocarbon of at least 3 carbon atoms polymerized through the ethylenic unsaturation thereof and the ratio of y:x is no more than about 0.5. When the preferred copolymers are produced according to the invention there will be no second hydrocarbon present and the polymers are represented by the above formula wherein y is zero. When y is other than zero, i.e., terpolymers are produced, the —CO—(—CH₂CH₂—)— units and the —CO—(—G—)— units are found randomly along the polymer chain and the preferred ratios of y:x are from about 0.01 to about 0.1. The end groups or "caps" of the polymer will depend upon what materials are present during polymerization and how and whether the polymer has been purified. The end groups are of little significance so far as the overall properties of the polymer are concerned so that the polymers are fairly represented by the polymer chain as depicted above.

Of particular interest are the polymers of number average molecular weight of from about 1000 to about 200,000, particularly those polymers of number average molecular weight of from about 20,000 to about 90,000, as determined by gel permeation chromatography. The physical properties of the polymers will depend in part on the molecular weight, whether the polymer is a copolymer or a terpolymer and, in the case of terpolymers, the nature of and the proportion of the second hydrocarbon present. Typical melting points for such polymers are from about 175° C. to about 300° C., preferably from about 210° C. to about 270° C. The polymers will have a limiting viscosity number (LVN), as measured in a standard capillary viscosity measuring device in m-cresol at 60° C., of from about 0.4 dl/g to about 10 dl/g but more often from about 0.8 dl/g to about 4 dl/g.

The polymers are produced by the general procedures of the above published European Patent Applications preferably employing a catalyst composition formed from a compound of palladium, an anion of a non-hydrohalogenic acid havig a pKa below 2 and a bidentate ligand of phosphorus. The palladium compound is suitably a palladium carboxylate such as palladium acetate, palladium propionate, palladium butyrate or palladium hexanoate, but preferably is palladium acetate. Strong non-hydrohalogenic acids whose anions suitably serve as precursors of the catalyst composition include inorganic acids such as sulfuric acid and perchloric acid and organic acids including carboxylic acids such as trifluoroacetic acid, difluoroacetic acid, trichloroacetic acid and dichloroacetic acid and sulfonic acids including p-toluenesulfonic acid and methanesulfonic acid. The preferred anions are derived from trifluoroacetic acid or p-toluenesulfonic acid. The anion is preferably provided as the free acid but alternatively may be provided as a metal salt, particularly a non-noble transition metal salt. However provided, the quantity of anion to be used is from about 1 mole to about 100 moles per mole of palladium. Preferred quantities of anion are from about 2 moles to about 50 moles per mole of palladium.

The bidentate ligand of phosphorus from which the catalyst composition is formed is represented by the formula

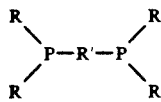

(II)

wherein R independently is aliphatic or aromatic of up to 10 carbon atoms inclusive. R is suitably hydrocarbon containing only carbon and hydrogen or is substituted hydrocarbon containing additional atoms, preferably in the form of carbon atom substituents. Illustrative of suitable aliphatic R groups are ethyl, propyl, hexyl, octyl, 2-chloroethyl, 3-methoxypropyl and 6-bromohexyl. Suitable hydrocarbyl aromatic R groups include phenyl, naphtyl and tolyl. The preferred R groups are substituted hydrocarbyl aromatic groups, particularly those that contain at least one polar substituent, especially an alkoxy substituent, on an aromatic ring carbon atom which is ortho to the carbon atom through which the R group is attached to the phosphorus. Illustrative of such preferred R groups are 2-methoxyphenyl, 2-ethoxyphenyl, 2-butoxyphenyl, 2,6-dimethoxyphenyl and 2,4-dimethoxyphenyl. The R' group is a divalent linking group of up to 10 carbon atoms inclusive with from 2 to 4 carbon atoms in the bridge. Such linking groups include 1,2-ethylene, 1,2-propylene, 1,3-propylene, 2,2-dimethyl-1,3-propylene and 1,4-butylene. The preferred R' group is the trimethylene or 1,3-propylene group. Preferred as the bidentate ligand of phosphorus containing hydrocarbyl R groups is 1,3-bis(diphenylphosphino)propane but most preferred as the bidentate ligand is 1,3-bis[di(2-methoxyphenyl)phosphino]propane. The bidentate phosphorus ligand is employed in a quantity of from 0.5 mole to about 2 moles per mole of palladium. More typically, the quantity of palladium to be employed is from about 0.75 mole to about 1.5 mole per mole of palladium.

Broadly speaking, the polymerization process is conducted by contacting the carbon monoxide and hydrocarbon reactants under polymerization conditions in the presence of the catalyst composition and a reaction diluent. Typical reaction diluents are the lower alkanols such as methanol and ethanol and the lower alkanones such as acetone and methyl ethyl ketone. Methanol is the preferred reaction diluent. The molar ratio of carbon monoxide to ethylenically unsaturated hydrocarbon is from about 10:1 to about 1:10 but preferably is from about 5:1 to about 1:5. The catalyst composition is employed in a catalytic quantity. Amounts of catalyst composition sufficient to provide from about $1 \times 10^{-7}$ mole to about $1 \times 10^{-3}$ mole of palladium per mole of total ethylenically hydrocarbon but amounts of catalyst composition sufficient to provide from about $1 \times 10^{-6}$ mole to about $1 \times 10^{-4}$ mole of palladium per mole of total ethylenically unsaturated hydrocarbon. Typical polymerization conditions include a reaction temperature from about 25° C. to about 150° C., preferably from about 30° C. to about 130° C. Useful polymerization pressures are from about 2 bar to about 150 bar; more typically from about 5 bar to about 100 bar. The polymer product is customarily obtained as a suspension of the insoluble polymer in the reaction diluent. The polymer is recovered by conventional methods such as filtration or centrifugation and is purified, if desired, by treatment with a solvent or a complexing agent selective for catalyst residues.

The continuous process of the invention is conducted by continuously introducing to a reactor the carbon monoxide and hydrocarbon reactants and include a reaction temperature from about 25° C. to about 150° C., preferably from about 30° C. to about 130° C. Useful polymerization pressures are from about 2 bar to about 150 bar; more typically from about 5 bar to about 100 bar. The polymer product is customarily obtained as a suspension of the insoluble polymer in the reaction diluent. The polymer is recovered by conventional methods such as filtration or centrifugation and is purified, if desired, by treatment with a solvent or a complexing agent selective for catalyst residues.

The continuous process of the invention is conducted by continuously introducing to a reactor the carbon monoxide and hydrocarbon reactants and withdrawing polymer suspension from the reactor. The pressure is maintained substantially constant by venting unreacted gases is necessary. During a typical initiation or start-up period of the process, the concentration of the polymer increases until it reaches a substantially constant value as the reaction reaches steady state operation. At this steady state the bulk density of the polymer also remains substantially constant. The process of the present invention includes start-up procedures which result in desirably high polymer suspension concentration and polymer bulk density in a relatively short period of time.

The advantages of the present invention are realized by the inclusion within the reaction system at the initiation of polymerization of an amount of previously prepared linear alternating polymer of carbon monoxide and at least one ethylenically unsaturated hydrocarbon. In one embodiment, the previously prepared polymer, obtained from a separate production, is provided to the continuous reactor to afford a polymer suspension concentration at the start-up of the continuous process. This polymer may have substantially the same composition and molecular weight as the polymer whose production is desired or alternatively may be a linear alternating polymer of different composition and/or molecular weight, but will preferably contain at least moieties of carbon monoxide and ethylene. In a particularly preferred embodiment, however, the polymerization is initially operated in the reactor in a batchwise manner to produce linear alternating polymer and the process is then converted to continuous operation of the character described above in the presence of the polymer suspension produced during batchwise operations. In either embodiment it is preferred that the polymer suspension concentration be at least about 12.5% by weight based on the non-gaseous reaction mixture at the start-up of the continuous process.

In the embodiment wherein the previously prepared polymer is produced by batchwise operation prior to start up of the continuous process, the concentration of catalyst composition to be used in the batchwise process should be substantially the same or greater than the catalyst composition to be used during the continuous operation. If a higher catalyst composition concentration is used during the batchwise operation, the concentration is gradually reduced during or immediately after the start-up procedure to that catalyst composition concentration desired for steady state operation.

The continuous process of the invention is characterized by a shorter induction or start-up period as compared to processes which do not incorporate previously prepared polymer within the reaction mixture at the initiation of continuous operation. When steady state is reached, the product mixture will have a desirably high polymer suspension concentration and the polymer product will have a desirably high bulk density. The polyketone product is a thermoplastic material and is processed into shaped articles of established utility by procedures conventional for thermoplastic polymers such as injection molding, extrusion and thermoforming. Particular applications include the production of containers for food and drink and parts and housings for automotive applications.

The invention is further illustrated by the following Illustrative Embodiments which should not be regarded as limiting. The polymer product of each Illustrative Embodiment was examined by $^{13}C$-NMR and found to be a linear alternating copolymer in the case of Illustrative Embodiment V and a linear alternating terpolymer in the case of Illustrative Embodiments I-IV and VI. In each Illustrative Embodiment, the catalyst composition was provided by two solutions introduced into the reactor. Solution 1 contained 1000 mg of palladium acetate, 2491 mg of 1,3-bis[di(2-methoxyphenyl)phosphino]propane and 1067 mg of trifluoroacetic acid per liter of acetone. Solution 2 contained 3000 mg of trifluoroacetic acid per liter of acetone.

ILLUSTRATIVE EMBODIMENT I

A reactor employed in the production of a terpolymer of carbon monoxide, ethylene and propylene was charged with 53 kg of methanol and 20 kg of a previously prepared linear alternating terpolymer of carbon monoxide, ethylene and propylene having a bulk density of 380 kg/m$^3$. The reactor and contents were heated to 77° C. and a 23:54:23% by mole mixture of carbon monoxide, ethylene and propylene was introduced to provide a pressure of 45 bar which was maintained during polymerization by continuous addition of the mixture.

At the initiation of polymerization, termed run-hour zero, methanol was introduced at a rate of 5 kg/hr, Solution 1 was introduced at a rate of 37 ml/hr and Solution 2 at a rate of 25 ml/hr. At run-hour 14 the polymer suspension concentration was 15.5% by weight and the bulk density of the polymer was 190 kg/m$^3$. At run-hour 28 the polymer suspension concentration was 18.5% by weight and the bulk density of the polymer was 240 kg/m$^3$. At run-hour 45 the polymer suspension concentration was 22% by weight and the bulk density of the polymer was 300 kg/m$^3$. At run-hour 80 the same values were found for the polymer suspension concentration and bulk density.

ILLUSTRATIVE EMBODIMENT II

The procedure of Illustrative Embodiment I was repeated to produce a carbon monoxide/ethylene/propylene terpolymer except that at run-hour zero the rate of addition of Solution 1 was 100 ml/hr and the rate of addition of Solution 2 was 68 ml/hr. At run-hour 5 the polymer suspension concentration was 24% by weight and the bulk density of the polymer was 350 kg/m$^3$. The rate of addition of Solutions 1 and 2 was then lowered to 37 ml/hr and 25 ml/hr respectively. At run-hour 10 the polymer suspension concentration was 22% by weight and the bulk density of the polymer product was 300 kg/m$^3$. At run-hour 45 the same values for polymer suspension concentration and bulk density were found.

ILLUSTRATIVE EMBODIMENT III

A terpolymer of carbon monoxide, ethylene and propylene was produced by a several-step process. In the first step a batch polymerization was conducted using a concentration of catalyst composition in reaction diluent lower than that required to give a desirable steady state product mixture. In the second step the polymerization was continued in a continuous manner using an initial catalyst composition concentration higher than that required for a desirable steady state but lowering the catalyst concentration as polymerization progressed.

To the reactor were charged 50 kg of methanol and 1 kg of a linear alternating terpolymer of carbon monoxide, ethylene and propylene. The reactor temperature was raised to 78° C. and the reactor pressure was raised to 45 bar by addition of a 29:42:29 mole % mixture of carbon monoxide, ethylene and propylene. During polymerization the pressure was maintained by addition of an equimolar mixture of carbon monoxide and ethylene.

At run-hour zero, 211 ml of Solution 1 and 282 ml of Solution 2 were provided. At run-hour 18 the polymer suspension concentration was 21% by weight and the bulk density of the polymers was 360 kg/m$^3$. At run-hour 22 the process was switched to continuous operation by continuously adding methanol at the rate of 3.5 kg/hr, Solution 1 at the rate of 100 ml/hr and Solution 2 at the rate of 68 ml/hr and continuously withdrawing polymer product suspension. At run-hour 25 the polymer suspension concentration was 23% by weight and the bulk density of the polymer was 350 kg/m$^3$. At this time the feed rates for Solutions 1 and 2 were reduced to 26 ml/hr and 17 ml/hr respectively. At run-hour 40 the polymer suspension concentration was 23% by weight and the polymer bulk density was 360 kg/hr. The same values for polymer suspension concentration and bulk density were found at run-hour 80.

ILLUSTRATIVE EMBODIMENT IV

A terpolymer of carbon monoxide, ethylene and propylene was produced by batchwise operation followed by continuous operation. To a reactor was charged 50 kg of methanol and 0.5 kg of a linear alternating terpolymer of carbon monoxide, ethylene and propylene. The reactor temperature was raised to 75° C. and a 29:42:29 mole % mixture of carbon monoxide, ethylene and propylene was added to give a pressure of 45 bar. During polymerization, the pressure was maintained at 45 bar by continuous addition of an equimolar mixture of carbon monoxide and ethylene.

At run-hour zero 369 ml of Solution 1 and 244 ml of Solution 2 were introduced into the reactor. At run-hour 10 the polymer suspension concentration was 13% by weight and the bulk density of the polymer was 300 kg/m$^3$. At run-hour 14, continuous operation was commenced by continuously adding methanol at the rate of 3.5 kg/hr, Solution 1 at the rate of 26 ml/hr and Solution 2 at the rate of 17 ml/hr and continuously removing polymer suspension mixture. At run-hour 30 the polymer suspension concentration was 21% by weight and the bulk density of the polymer was 240 kg/m$^3$. At run-hour 40 the polymer suspension concentration was 23% by weight and the polymer bulk density was 260 kg/m$^3$. The same values for polymer suspension concentration and bulk density were found at run-hour 80.

ILLUSTRATIVE EMBODIMENT V

A copolymer of carbon monoxide and ethylene was produced by a process which was initially a batch process and subsequently a continuous process. To a reactor was charged 55 kg of methanol and 1 kg of a linear alternating terpolymer of carbon monoxide, ethylene and propylene. The reactor temperature was raised to 93° C. and a mixture of 67 mole % carbon monoxide 33 mole % ethylene was introduced until the pressure was 45 bar. During the initial batch polymerization the pressure was maintained at 45 bar by addition of an equimolar mixture of carbon monoxide and ethylene.

At run-hour zero, 93 ml of Solution 1 and 124 ml of Solution 2 were introduced into the reactor. At run-hour 18 the polymer suspension concentration was 18.5% by weight and the bulk density of the polymer was 230 kg/m$^3$. At run-hour 22, the polymerization was changed to a continuous process by continuously adding methanol at the rate of 3.5 kg/hr, Solution 1 at the rate of 6 ml/hr and Solution 2 at the rate of 4 ml/hr and continuously removing polymer suspension mixture. During the period from run-hour 22 to run-hour 26 the composition of the introduced gas was gradually changed to a 67:23 mole % mixture of carbon monoxide and ethylene. At run-hour 26 the polymer suspension concentration was 21% by weight and the polymer bulk density was 250 kg/m$^3$. The same values were found at run-hour 80.

ILLUSTRATIVE EMBODIMENT VI

A carbon monoxide/ethylene/propylene terpolymer was prepared in a two-step batch process followed by continuous operation. To a reactor were charged 48 kg of methanol and 1.0 kg of a linear alternating terpolymer of carbon monoxide, ethylene and propylene. The reactor temperature was raised to 78° C. and a 24:54:20 mole % mixture of carbon monoxide, ethylene and propylene was introduced to give a pressure of 45 bar. During polymerization the pressure was maintained at 45 bar by the continuous addition of an equimolar mixture of carbon monoxide and ethylene.

At run-hour zero, 127 ml of Solution 1 and 169 ml of Solution 2 were introduced into the reactor. At run-hour 11 the polymer suspension concentration was 9.5% by weight and the bulk density of the polymer was 170 kg/m$^3$. At run-hour 15, 151 ml of Solution 1 and 203 ml of Solution 2 were introduced into the reactor. At run-hour 18 the polymer suspension concentration was 19% by weight and the bulk density of the polymer was 250 kg/m$^3$.

At run-hour 22 the polymerization was changed to a continuous process by adding methanol at the rate of 3.5 kg/hr, Solution 1 at the rate of 20 ml/hr and Solution 2 at the rate of 14 ml/hr and continuously removing polymer suspension mixture. At run-hour 30 the polymer suspension concentration was 24% by weight and the bulk density of the polymer was 280 kg/m$^3$. At run-hour 40 the polymer suspension concentration was 25% by weight and the bulk density was 280 kg/m$^3$. The same values were found at run-hour 80.

What is claimed is:

1. In the process of producing a linear alternating polymer of carbon monoxide and at least one ethylenically unsaturated hydrocarbon by contacting in a reactor the carbon monoxide and hydrocarbon under polymerization conditions in the presence of a reaction diluent and a catalyst composition formed from a compound of palladium, the anion of a strong non-hydrohalogenic acid and a bidentate ligand of phosphorus, the improvement of operating the reactor initially in a batchwise manner to produce a linear alternating polymer suspension, and subsequently converting the reactor to a continuous operation in the presence of the polymer suspension produced during the batchwise operation.

2. The process of claim 1 wherein the linear alternating polymer is present in the suspension produced in the batchwise manner in at least about 12.5% by weight based on total non-gaseous reaction mixture before the reactor is converted to a continuous operation.

3. In the process of producing a linear alternating copolymer of carbon monoxide and ethylene by contacting in a reactor the carbon monoxide and ethylene under polymerization conditions in the presence of a methanol reaction diluent and a catalyst composition formed from palladium acetate, the anion of trifluoroacetic acid or p-toluenesulfonic acid, and 1,3-bis(diphenylphosphino)propane or 1,3-bis[di(2-methoxyphenyl)phosphino]propane, the improvement of operating the reactor initially in a batchwise manner to produce a linear alternating polymer suspension, and subsequently converting the reactor to a continuous operation in the presence of the polymer suspension produced during the batchwise operation.

4. The process of claim 3 wherein the linear alternating polymer is present in the suspension produced in the batchwise manner in at least about 12.5% by weight based on the total non-gaseous reaction mixture before the reactor is converted to a continuous operation.

5. In the process of producing a linear alternating terpolymer of carbon monoxide, ethylene and propylene by contacting in a reactor carbon monoxide, ethylene and propylene under polymerization conditions in the presence of a methanol reaction diluent and a catalyst composition formed from palladium acetate, the anion of trifluoroacetic acid or p-toluenesulfonic acid, and 1,3-bis(diphenylphosphino)propane or 1,3-bis[di(2-methoxyphenyl)phosphino]propane, the improvement of operating the reactor initially in a batchwise manner to produce a linear alternating polymer suspension, and subsequently converting the reactor to a continuous operation in the presence of the polymer suspension produced during the batchwise operation.

6. The process of claim 5 wherein the linear alternating polymer present in the suspension produced in the batchwise manner in at least about 12.5% by weight based on the total non-gaseous reaction mixture before the reactor is converted to a continuous operation.

7. The process of claim 1 wherein the catalyst composition is present in the reactor at a concentration that is substantially the same during both the batchwise operation and the continuous operation.

8. The process of claim 1 wherein the catalyst composition is present in the reactor at a greater concentration during the batchwise operation than during the continuous operation.

9. The process of claim 1 wherein the linear alternating polymer produced during the batchwise operation is the same as the polymer produced when the reactor is converted to the continuous operation.

10. The process of claim 3 wherein the catalyst composition is present in the reactor at a concentration that is substantially the same during both the batchwise operation and the continuous operation.

11. The process of claim 3 wherein the catalyst composition is present in the reactor at a greater concentration during the batchwise operation than during the continuous operation.

12. The process of claim 3 wherein the linear alternating polymer produced during the batchwise operation is the same as the polymer produced when the reactor is converted to the continuous operation.

13. The process of claim 5 wherein the catalyst composition is present in the reactor at a concentration that is substantially the same during both the batchwise operation and the continuous operation.

14. The process of claim 5 wherein the catalyst composition is present in the reactor at a greater concentration during the batchwise operation than during the continuous operation.

15. The process of claim 5 wherein the linear alternating polymer produced during the batchwise operation is the same as the polymer produced when the reactor is converted to the continuous operation.

* * * * *